United States Patent
Hao et al.

(10) Patent No.: US 9,916,028 B2
(45) Date of Patent: Mar. 13, 2018

(54) TOUCH SYSTEM AND DISPLAY DEVICE FOR PREVENTING MISOPERATION ON EDGE AREA

(71) Applicants: BOE TECHNOLOGY GROUP CO., LTD., Beijing (CN); BEIJING BOE DISPLAY TECHNOLOGY CO., LTD., Beijing (CN)

(72) Inventors: Yutao Hao, Beijing (CN); Bin Zou, Beijing (CN); Qian Zhang, Beijing (CN); Xiang Li, Beijing (CN); Jinku Lv, Beijing (CN); Hongyu Zhao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 60 days.

(21) Appl. No.: 14/422,266

(22) PCT Filed: May 30, 2014

(86) PCT No.: PCT/CN2014/078887
§ 371 (c)(1),
(2) Date: Feb. 18, 2015

(87) PCT Pub. No.: WO2015/070590
PCT Pub. Date: May 21, 2015

(65) Prior Publication Data
US 2016/0034090 A1 Feb. 4, 2016

(30) Foreign Application Priority Data
Nov. 15, 2013 (CN) .......................... 2013 1 0575149

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/044* (2013.01); *G06F 3/045* (2013.01); *G06F 3/0412* (2013.01);
(Continued)

(58) Field of Classification Search
CPC ...... G06F 3/04886; G06F 3/041–3/047; G06F 3/045; G01R 27/26
See application file for complete search history.

(56) References Cited

U.S. PATENT DOCUMENTS

2009/0153509 A1* 6/2009 Jiang ..................... G06F 3/0416
345/173
2009/0174679 A1* 7/2009 Westerman ......... G06F 3/03547
345/173
(Continued)

FOREIGN PATENT DOCUMENTS

CN 102830844 A 12/2012
CN 103235695 A 8/2013
(Continued)

OTHER PUBLICATIONS

Chinese Patent Application No. 201310575149.8, Office Action dated Nov. 19, 2015, seven (7) pages, English translation five (5) pages.
(Continued)

*Primary Examiner* — Pegeman Karimi
(74) *Attorney, Agent, or Firm* — Nath, Goldberg & Meyer; Joshua B. Goldberg; Annie J. Kock

(57) ABSTRACT

The present invention provides a touch system and a display device, belongs to the technical field of display, and can
(Continued)

solve the problem that misoperation is caused as an existing touch screen has a narrow frame and the edge area of the screen is easy to touch mistakenly. The touch system comprises a touch screen, a touch position analysis unit and a switch unit, wherein the touch screen comprises a center touch area and an edge touch area, and the touch position analysis unit is used for analyzing a position of a touch on the touch screen; and the switch unit is used for controlling whether a touch on the edge touch area is effective.

16 Claims, 1 Drawing Sheet

(51) Int. Cl.
*G06F 3/044* (2006.01)
*G06F 3/045* (2006.01)
*G09G 3/3208* (2016.01)
*G09G 3/36* (2006.01)

(52) U.S. Cl.
CPC ........ *G06F 3/0488* (2013.01); *G06F 3/04886* (2013.01); *G09G 3/3208* (2013.01); *G09G 3/36* (2013.01); *G06F 2203/04104* (2013.01); *G06F 2203/04106* (2013.01); *G06F 2203/04808* (2013.01)

(56) References Cited

U.S. PATENT DOCUMENTS

| | | | | | |
|---|---|---|---|---|---|
| 2010/0156795 | A1* | 6/2010 | Kim | ................ | G06F 3/044 345/168 |
| 2011/0279391 | A1* | 11/2011 | Nakai | ................ | B60K 35/00 345/173 |
| 2012/0075212 | A1* | 3/2012 | Park | ................ | G06F 3/04886 345/173 |
| 2012/0235836 | A1* | 9/2012 | Kikuchi | ................ | G06F 3/0416 341/20 |
| 2013/0069886 | A1* | 3/2013 | Wang | ................ | G06F 3/044 345/173 |
| 2013/0088445 | A1* | 4/2013 | Kang | ................ | G06F 3/04886 345/173 |
| 2013/0246861 | A1* | 9/2013 | Colley | ................ | G06F 3/0488 714/48 |
| 2014/0049494 | A1* | 2/2014 | Niu | ................ | G06F 3/0488 345/173 |
| 2014/0168076 | A1* | 6/2014 | Hicks | ................ | G06F 3/0488 345/157 |
| 2014/0225857 | A1* | 8/2014 | Ma | ................ | G06F 3/017 345/174 |
| 2014/0232676 | A1* | 8/2014 | Shimizu | ................ | G06F 3/041 345/173 |
| 2014/0300559 | A1* | 10/2014 | Tanimoto | ................ | G06F 3/0416 345/173 |
| 2016/0062545 | A1* | 3/2016 | Lai | ................ | G06F 3/0418 345/174 |

FOREIGN PATENT DOCUMENTS

| | | |
|---|---|---|
| CN | 103246380 A | 8/2013 |
| CN | 103558954 A | 2/2014 |
| WO | 2009/054561 A1 | 4/2009 |

OTHER PUBLICATIONS

International Patent Application No. PCT/CN2014/078887, English translation of Written Opinion of the International Searching Authority dated Aug. 22, 2014, three (3) pages, previously submitted in Chinese on Feb. 18, 2015.

International Application No. PCT/CN2014/078887, International Search Report dated Aug. 22, 2014, twelve (12) pages.

* cited by examiner

TOUCH SYSTEM AND DISPLAY DEVICE FOR PREVENTING MISOPERATION ON EDGE AREA

This is a National Phase Application filed under 35 U.S.C. 371 as a national stage of PCT/CN2014/078887, filed May 30, 2014, and claims priority benefit from Chinese Application No. 201310575149.8, filed Nov. 15, 2013, the content of each of which is hereby incorporated by reference in its entirety.

FIELD OF THE INVENTION

The present invention belongs to the technical field of display, and particularly relates to a touch system and a display device.

BACKGROUND OF THE INVENTION

Touch screens are recently developing electronic input device, and are widely applied to electronic equipment such as smart phones, tablet computers or the like. The frame of a display screen (phone screen) of electronic equipment is increasingly narrow, and when a user holds the equipment, a finger easily touches the edge area of the display screen to mistakenly touch a program which should not be touched, so as to cause misoperation.

SUMMARY OF THE INVENTION

For solving the technical problem that misoperation tends to be caused as an existing touch screen has an increasingly narrow frame and the edge of the screen is easy to touch mistakenly, the present invention provides a touch system capable of effectively avoiding misoperation caused when the edge of the screen is touched and a display device.

The technical solutions adopted for solving the above technical problem involve a touch system, including a touch screen, a touch position analysis unit and a switch unit, wherein the touch screen includes a center touch area and an edge touch area, the touch position analysis unit is used for analyzing a position of a touch on the touch screen;

the switch unit is used for controlling whether a touch on the edge touch area is effective.

The touch screen of the touch system of the present invention is divided into the center touch area and the edge touch area, the switch unit may control whether the touch on the edge touch area is effective. The switch unit may be turned off when a control command to be executed is not in the edge touch area, and then the touch on the edge touch area is ineffective, so that misoperation caused as the edge touch area is touched due to the narrow frame of the touch screen may be effectively avoided.

Preferably, the touch position analysis unit includes a storage unit and a query unit, the storage unit is stored therein position information corresponding to the center touch area and the edge touch area respectively;

the query unit is used for judging whether position information corresponding to current touched position of the touch screen belongs to the center touch area or the edge touch area.

Preferably, the touch screen includes a display unit for displaying and a touch unit for sensing touch.

Further preferably, the display unit is an LCD or an OLED display.

Further preferably, the touch unit is a resistive touch unit or a capacitive touch unit.

Preferably, the switch unit is arranged on a side of a frame of the touch screen.

Preferably, the touch screen is divided into the center touch area and the edge touch area by hardware;

or divided into the center touch area and the edge touch area under control of software.

The technical solutions adopted for solving the above technical problem involve a display device, including the above-mentioned touch system.

Since the display device includes the above-mentioned touch system, misoperation caused as the edge touch area is touched may be effectively avoided.

DETAILED DESCRIPTION OF THE EMBODIMENTS

To make those skilled in the art better understand the technical solutions of the present invention, the present invention will be further described in detail below in combination with the accompanying drawings and specific embodiments.

Embodiment 1

Figure 1:
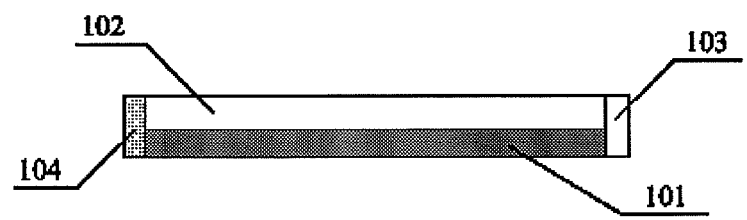
FIG. 1 is a schematic diagram of a touch system of embodiment 1 of the present invention.
Figure 2:
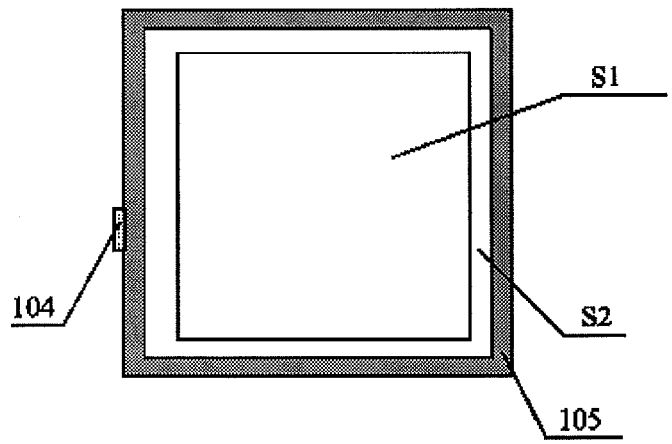
FIG. 2 is a top view of the touch system of embodiment 1 of the present invention.

As shown in FIGS. 1 and 2, this embodiment provides a touch system, including a touch screen, a touch position analysis unit 103 and a switch unit 104. The touch screen includes a center touch area S1 and an edge touch area S2, the touch position analysis unit 103 is used for analyzing a position of a touch on the touch screen, and the switch unit 104 is used for controlling whether a touch on the edge touch area S2 is effective.

The touch screen provided by this embodiment is divided into the center touch area S1 and the edge touch area S2, and the switch unit 104 controls whether the touch on the edge touch area S2 is effective. Thus, misoperation caused as software or a program on the edge touch area S2 is mistakenly touched may be effectively avoided. That is to say, when the position of software or a program to be touched is in the edge touch area S2, the switch unit 104 is turned on, then the touch on the edge touch area S2 is effective, and the software or the program may be driven or opened to execute a command; and when the position of software or a program to be touched is in the center touch area S1, the switch unit 104 is turned off, then the touch on the edge touch area S2 is ineffective, and even if software or a program in the edge touch area S2 is touched, the software or the program in the edge touch area S2 is not opened.

The touch position analysis unit 103 of the touch system of this embodiment preferably includes a storage unit and a query unit, and position information corresponding to the center touch area S1 and the edge touch area S2 respectively is stored in the storage unit; and specifically, the whole touch screen is stored in the storage unit in a form of coordinates, that is, a group of coordinates corresponds to a touch point (position information). Preferably, the coordinates of the center touch area S1 and the coordinates of the edge touch area S2 may be independently stored in the storage unit respectively. The query unit is used for judging whether position information corresponding to current touched position of the touch screen belongs to the center touch area S1 or the edge touch area S2.

When a certain position of the touch screen is touched, whether the touch position is in the center touch area S1 or the edge touch area S2 may be judged according to the coordinate information of the position; when it is judged that the touch position is in the center touch area S1, a touch command is normally executed; when it is judged that the touch position is in the edge touch area S2, whether the switch unit 104 is turned off or on is judged, and at the moment, if the touch command which needs to be executed is in the edge touch area S2, the switch unit 104 is turned on and the touch command is executed; and if the touch command to be executed is in the center touch area S1, the switch unit 104 is kept off.

Preferably, the touch screen of the touch system of this embodiment includes a display unit 101 for displaying and a touch unit 102 for sensing a touch position. The touch unit 102 may be arranged above the display unit 101 or integrated with the display unit 101. Further preferably, the display unit 101 is an LCD or an OLED display, of course, may be a display of other types. The touch unit 102 is a resistive touch unit or a capacitive touch unit. The display 101 is combined with the resistive touch unit to form a resistive touch screen, in which contents on the touch screen are operated and controlled mainly on the basis of the principle of pressure sensing. The display 101 is combined with the capacitive touch unit to form a capacitive touch screen, and the transmittance and definition of the capacitive touch screen are superior to those of the resistive touch screen. When a finger of a user touches the capacitive touch screen, the finger and the surface of the capacitive touch screen form a coupling capacitor, so as to realize a touch function.

Preferably, the switch unit 104 is arranged on a side of a frame 105 of the touch screen. Generally, the switch unit 104 is a control button, namely a simple high and low level switch, high level is obtained when the switch is turned on, and low level is obtained when the switch is turned off. The switch unit 104 which is arranged on the side of the touch screen does not occupy the area of the display area (an area for displaying images), so that the frame 105 is narrower and more attractive in appearance. Of course, the switch unit 104 may also be arranged in other position of the touch system.

Preferably, the touch screen is directly divided into the center touch area S1 and the edge touch area S2 by hardware, that is to say, the touch screen is divided into the center touch area S1 and the edge touch area S2 when being manufactured, or the touch screen is preferably divided into the center touch area S1 and the edge touch area S2 under control of software, and the proportion of the center touch area S1 and the edge touch area S2 to the whole touch screen may be adjusted according to different conditions.

Embodiment 2

This embodiment provides a display device, including the touch system of embodiment 1. The display device may be any product or component with a display function such as a mobile phone, a tablet computer, a television, a display, a notebook computer, a digital photo frame, a navigator or the like.

Since the display device of this embodiment includes the touch system of embodiment 1, misoperation caused as the edge area of the touch screen is touched due to too narrow frame may be avoided.

Of course, the display device of this embodiment may further include other conventional structures, such as a power unit, a display drive unit and the like.

It could be understood that, the above embodiments are merely exemplary implementations adopted for describing the principle of the present invention, rather than limiting the present invention. Various modifications and improvements may be made for those of ordinary skill in the art without departing from the spirit and essence of the present invention, and these modifications and improvements are regarded within the protection scope of the present invention.

The invention claimed is:

1. A touch system, comprising a touch screen, and further comprising a touch position analyzer and a switch, wherein the touch screen comprises a center touch area and an edge touch area,
the touch position analyzer is configured for analyzing a position of a touch on the touch screen;
the switch is configured for controlling whether a touch on the edge touch area is effective,
wherein when the switch is turned on, the touch on the edge touch area is effective, and when the switch is turned off, the touch on the edge touch area is ineffective,
and wherein the switch is configured to be turned on in a case where a position of content to be touched is in the edge touch area and turned off in a case where the position of content to be touched is in the center touch area.

2. The touch system of claim 1, wherein the touch position analyzer comprises a storage and a querizer,
the storage is stored therein position information corresponding to the center touch area and the edge touch area respectively;
the querizer is used for judging whether position information corresponding to current touched position of the touch screen belongs to the center touch area or the edge touch area.

3. The touch system of claim 1, wherein the touch screen comprises a display unit for displaying and a touch unit for sensing touch.

4. The touch system of claim 3, wherein the display unit is an LCD display panel or an OLED display panel.

5. The touch system of claim 3, wherein the touch unit is a resistive touch unit or a capacitive touch unit.

6. The touch system of claim 1, wherein the switch is arranged on a side of a frame of the touch screen.

7. The touch system of claim 1, wherein the touch screen is divided into the center touch area and the edge touch area by hardware.

8. The touch system of claim 1, wherein the touch screen is divided into the center touch area and the edge touch area under control of software.

9. A display device, comprising a touch system, wherein the touch system comprises a touch screen, and further comprises a touch position analyzer and a switch, wherein the touch screen comprises a center touch area and an edge touch area,
the touch position analyzer is configured for analyzing a position of a touch on the touch screen;
the switch is configured for controlling whether a touch on the edge touch area is effective, wherein when the switch is turned on, the touch on the edge touch area is effective, and when the switch is turned off, the touch on the edge touch area is ineffective.

10. A display device of claim 9, wherein the touch position analyzer comprises a storage and a querizer, the storage is stored therein position information corresponding to the center touch area and the edge touch area respectively;

the querizer is used for judging whether position information corresponding to current touched position of the touch screen belongs to the center touch area or the edge touch area.

11. A display device of claim 9, wherein the touch screen comprises a display unit for displaying and a touch unit for sensing touch.

12. A display device of claim 11, wherein the display unit is an LCD display panel or an OLED display panel.

13. A display device of claim 11, wherein the touch unit is a resistive touch unit or a capacitive touch unit.

14. A display device of claim 9, wherein the switch is arranged on a side of a frame of the touch screen.

15. A display device of claim 9, wherein the touch screen is divided into the center touch area and the edge touch area by hardware.

16. A display device of claim 9, wherein the touch screen is divided into the center touch area and the edge touch area under control of software.

* * * * *